United States Patent

Namba

Patent Number: 5,303,331
Date of Patent: Apr. 12, 1994

[54] COMPOUND TYPE EXPERT SYSTEM
[75] Inventor: Yoichi Namba, Tokyo, Japan
[73] Assignee: Ricoh Company, Ltd., Tokyo, Japan
[21] Appl. No.: 671,484
[22] Filed: Mar. 19, 1991

[30] Foreign Application Priority Data

Mar. 27, 1990 [JP] Japan .................................. 2-78527
Feb. 28, 1991 [JP] Japan .................................. 3-057842

[51] Int. Cl.$^5$ .............................................. G06F 7/12
[52] U.S. Cl. ....................... 375/51; 395/11; 395/900; 395/906; 395/914
[58] Field of Search ............... 395/61, 900, 906, 11, 395/51

[56] References Cited

U.S. PATENT DOCUMENTS

| | | | |
|---|---|---|---|
| 4,875,184 | 10/1989 | Yamakawa | 364/807 |
| 5,012,430 | 4/1991 | Sakurai | 364/513 |
| 5,046,019 | 9/1991 | Basehore | 364/513 |
| 5,051,932 | 9/1991 | Inoue et al. | 364/550 |
| 5,175,795 | 2/1992 | Tsuda et al. | 395/3 |
| 5,191,638 | 3/1993 | Wakami et al. | 395/51 |

FOREIGN PATENT DOCUMENTS

| | | | |
|---|---|---|---|
| 123124 | 5/1988 | Japan | G06F 7/12 |
| 123177 | 5/1988 | Japan | G06G 7/12 |
| 123178 | 5/1988 | Japan | G06G 7/12 |

OTHER PUBLICATIONS

Larsen, P. M., "Industrial applications of fuzzy logic control", Intl. J. Man-Machine Studies, 1980, 3-10.

Bowen et al., "Conflict Resolution in Fuzzy Forward Chaining Production Systems", Proceedings AAAI88, Aug. 1988, 117-121.

Leung et al., "Applications of a novel fuzzy expert system shell," Expert Systems, vol. 6(1), Feb. 1989, 2-10.

Primary Examiner—Michael R. Fleming
Assistant Examiner—Robert W. Downs
Attorney, Agent, or Firm—Cooper & Dunham

[57] ABSTRACT

A compound type expert system comprising a first fuzzy expert system and a second expert system connected to the first expert system through a calculation control system. The first expert system executes fuzzy rule-based inference according to a first rule set that can describe ambiguity of language information and outputs a definite value. The second expert system executes rule-based inference according to a second rule set that can describe only information without ambiguity of language. The calculation control system is arranged between the first and second expert systems so as to activate the second expert system in response to the definite value output from the first expert system.

9 Claims, 7 Drawing Sheets

EXAMPLE OF RULE
DESCRIPTION

RULE1 : if  Z > t1            then Pa

RULE2 : if  Z ≦ t1, and  Z > t2   then Pb

RULE3 : if  Z ≧ t2            then Pc

COMPOUND TYPE EXPERT SYSTEM

BACKGROUND OF THE INVENTION

1. Field of the Invention

The present invention relates to a compound type expert system which is suitably applicable to a control system for optimization of a plant or an engine, a diagnostic device for a plant, an engine, a vehicle or a computer system, or a backup system for operation of a vehicle, computer equipments or domestic electric devices.

2. Description of the Related Art

An expert system operates with the use of a computer program based on a knowledge base of expert's knowledge in a specific field. Therefore, by using the expert system, even a non-professional can do works as good as an expert does, which increases the application of the expert system since it meets the requirements of upgrading the data-processing quality and decreasing the number of workers or operators.

However, in accodance with the related art expert system, the data of the knowledge base has to be written as definite information without fuzziness and contradiction. Also, it is difficult to write fuzzy information of human feelings such as "young" or "the color is a little thin" in the knowledge base. Accordingly, to make such a fuzzy and complicated decision or dudgement as human feelings, the data amount of the knowledge base becomes very enormous, which makes it difficult to maintain and tune the knowledge base data. This is because that the inference according to the related art expert system ignores the partial satisfaction of required conditions.

On the other hand, there is a fuzzy expert system to which the fuzzy theory is applied to quantify the fuzziness of language information. In accordance with the fuzzy expert system, since it is possible to use qualitative language data, the data amount of the knowledge base can be much reduced. Also, the system admits the partial satisfaction of conditions to make an inference and allows entry of contradictory data in appearece since the system makes a conciliated decision from a plurality of intermediate judgements.

However, in accordance with the inference algorithm of the expert system according to the related art, the final inference result obtained during the process of making the conciliated decision from a plurality of intermediate judgements gives only a qualitative analysis and can not be used as information in the subsequent data processing operation without additional information data of human judgement regarding the result.

For example, in the field of control technique, the information data requires a concrete definite value for control motion such as "set the temperature to be 45° C." or "incline the robot arm by 30° C.". In order to obtain such a concrete data, that is, to make the information not fuzzy, in the fuzzy expert system, a numerical data is calculated from the result of inference with the use of mathematical technique. However, as mentioned above, since the inference result is qualitative, it can not be determined whether the calculated value is reasonable or not.

It is to be noted that the expert system and the fuzzy expert system are disclosed in "Electronic Data Communication Handbook" edited by Electronic Data Communication Society, published by Ohm Co., 1988, Nikkei Electronics, Mar. 21, 1988, and Japanese Patent Application Laying Open (KOKAI) Nos. 63-123177 and 63-123124.

SUMMARY OF THE INVENTION

The present invention was made considering the above mentioned points. It is therefore an object of the present invention to provide a compound expert system in which the problems of the related art mentioned above are obviated and effective application range of the expert system can be remarkably widened.

The above mentioned object of the present invention can be achieved by a compound type expert system comprising:

a first expert system which executes fuzzy rule-based inference according to a first rule set which permits to describe ambiguity of language information and outputs a definite value;

a second expert system which executes rule-based inference according to a second rule set which describes only information without ambiguity of language; and a calculation control system arranged between the first and second expert systems so as to activate the second expert system in response to the definite value output from the first expert system.

That is, in accordance with the compound type expert system of the present invention, the problems of the related art are obviated by combining the expert system and the fuzzy expert system of the related art while maintaining the advantages of each of the expert system and the fuzzy expert system of the related art.

That is, conventionally, the expert system and the fuzzy expert system have not been combined together. This is because that the output result of the fuzzy expert system mainly gives only qualitative analysis and that it is not theoretically certain whether the definite value calculated from the fuzzy result is reasonable or not. The present invention makes it possible to combine the two systems, i.e., the ordinary expert system and the fuzzy expert system.

An advantage of the compound expert system of the present invention is that it becomes possible to remarkably widen the application range of the expert system which can be effectively operated.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described in detail hereinafter with reference to the drawings.

Figure 1:
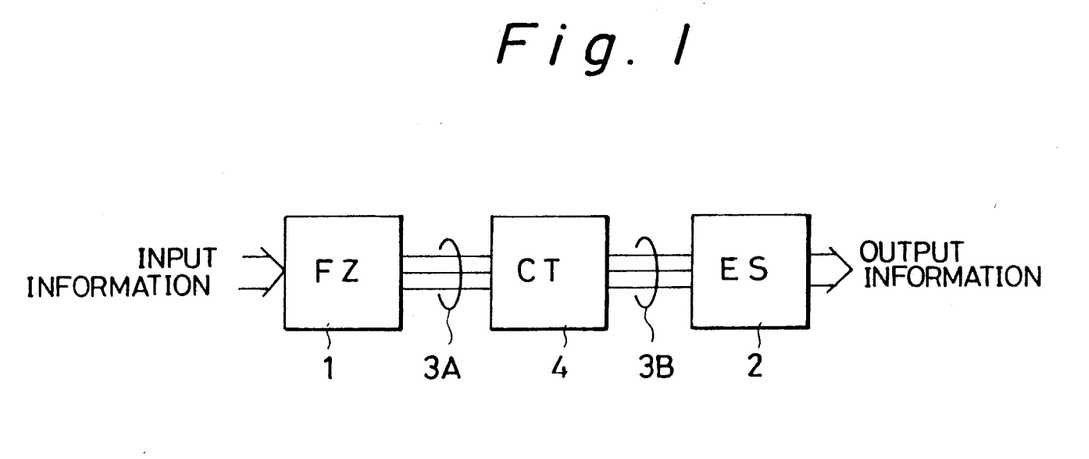
FIG. 1 is a constructional view of an embodiment of the compound expert system in accordance with the present invention.

FIG. 1 illustrates a structure of an embodiment of the compound type expert system in accordance with the present invention. In FIG. 1, numeral 1 designates a fuzzy expert system (FZ) which executes the fuzzy ruled-base inference on the basis of rules which can be written as fuzzy language information. Numeral 2 designates an expert system (ES) which executes the ruled-base inference on the basis of rules which can be written only in the form of definite information without fuzziness of the language information. Also, numeral 4 designates a calculation control system (CT) which is described in detail later. References 3A and 3B designate interfaces for connecting the fuzzy expert system 1 and the calculation control system 4, and the calculation control system 4 and the expert system 2, respectively.

In this particular embodiment, the arrangement is made in such a way that the system 1 covers the functional range of making information antifuzzy and outputs a plurality of definite values being made antifuzzy by the function thereof and that the system 2 arranged in conjunction with the system 1 is driven twice or more.

Figure 2:
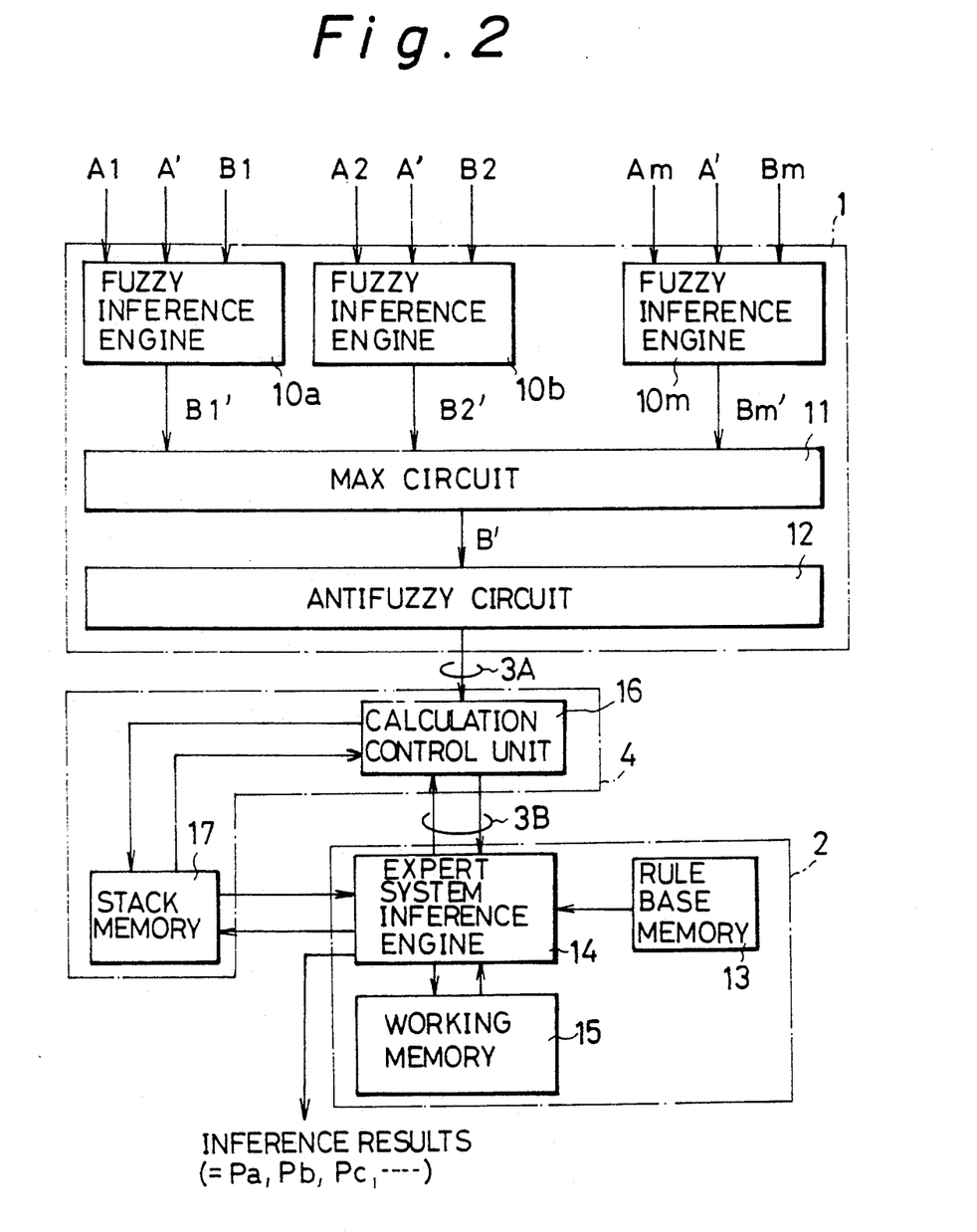
FIG. 2 is a block diagram representing the internal structure of the system of FIG. 1.

FIG. 2 illustrates internal structures of the systems 1, 2 and 4 of FIG. 1, respectively.

First, the system 1 comprises a plurality of fuzzy inference engines $10a$, $10b$, ..., $10m$ for matching the fuzzy rule with a fact $A'$, a MAX circuit 11 for compounding the inference results $Ba'$, $Bb'$, ..., $Bm'$ obtained from the engines $10a$, $10b$, ..., $10m$, and an antifuzzy circuit 12 which calculates a definite value from the final fuzzy inference result $B'$ output from the circuit 11 on the basis of a predetermined calculation method and outputs the calculated result.

Figure 5:
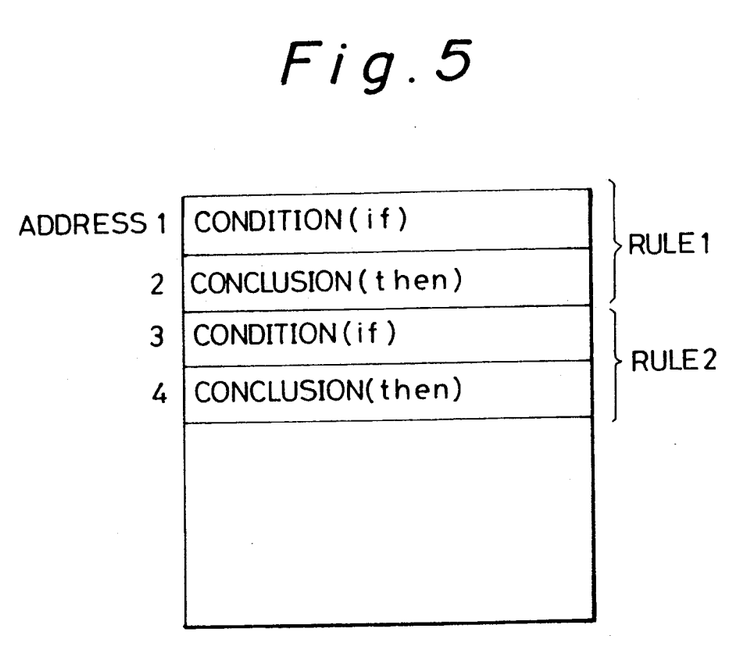
FIG. 5 is an explanatory view representing an example of the rule-base memory used in the system of the present invention.
Figure 6:
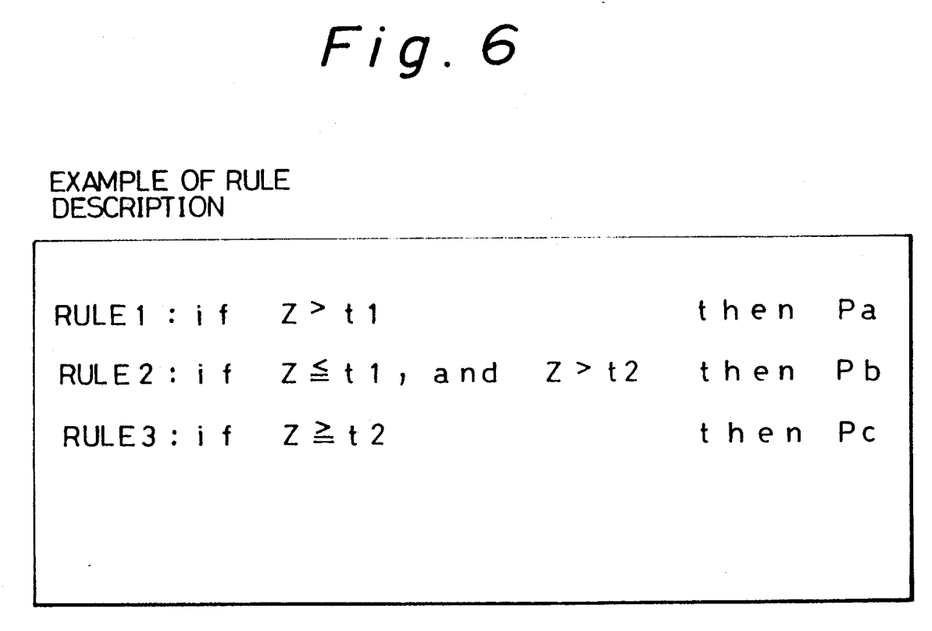
FIG. 6 is an explanatory view representing an example of rules written in the rule-base memory of FIG. 5.

Second, the system 2 comprises a rule-base memory 13 which registers rules written without fuzziness of language information, an expert system inference engine 14 for executing the rule-based inference process on the basis of the rules registered in the memory 13, and a working memory 15. The memory 13 and rules registered therein are exemplified in FIGS. 5 and 6, respectively.

Also, the system 4 comprises a calculation control unit 16 which creates a plurality of control values in accordance with the process described later on the basis of the definite value output from the system 1 and drives the system 2 by the times corresponding to the number of the control values, and a stack memory 17 used in the process of functioning the system 4.

The function of the structure mentioned above is described hereinafter.

The fuzzy expert system 1 executes the operation of matching the fuzzy rule and the fact $A'$ in parallel in the plurality of fuzzy inference engines $10a$, $10b$, ..., $10m$, respectively. The inference results $Ba'$, $Bb'$, ..., $Bm'$ obtained from the engines $10a$, $10b$, ..., $10m$, respectively, are compounded by the MAX circuit 11 to form a final fuzzy inference result $B'$ which is transmitted to the antifuzzy circuit 12.

The circuit 12 calculates one definite value from the inference result $B'$ which is merely a qualitative interpreting in accordance with a predetermined method for calculating a definite value, for example, a barycenter method. The calculated definite value is transmitted from the circuit 12 to the system 4. It is to be noted that, in accordance with the related art before the invention is made, the definite value calculated by the circuit 12 is directly transmitted to a subsequent expert system as a control data thereof.

Figure 3A:
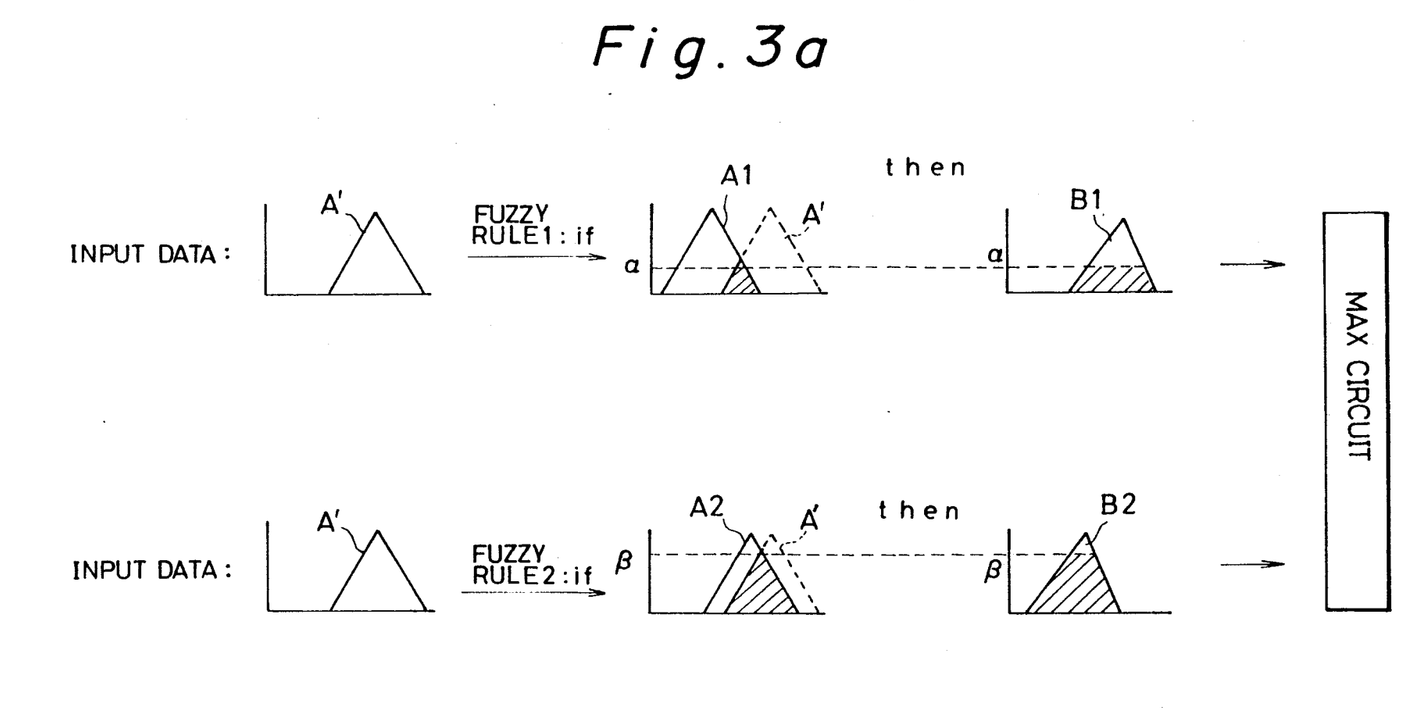
FIG. 3a is an explanatory view for explaining the function of a part of the structure of FIG. 2.
Figure 3B:
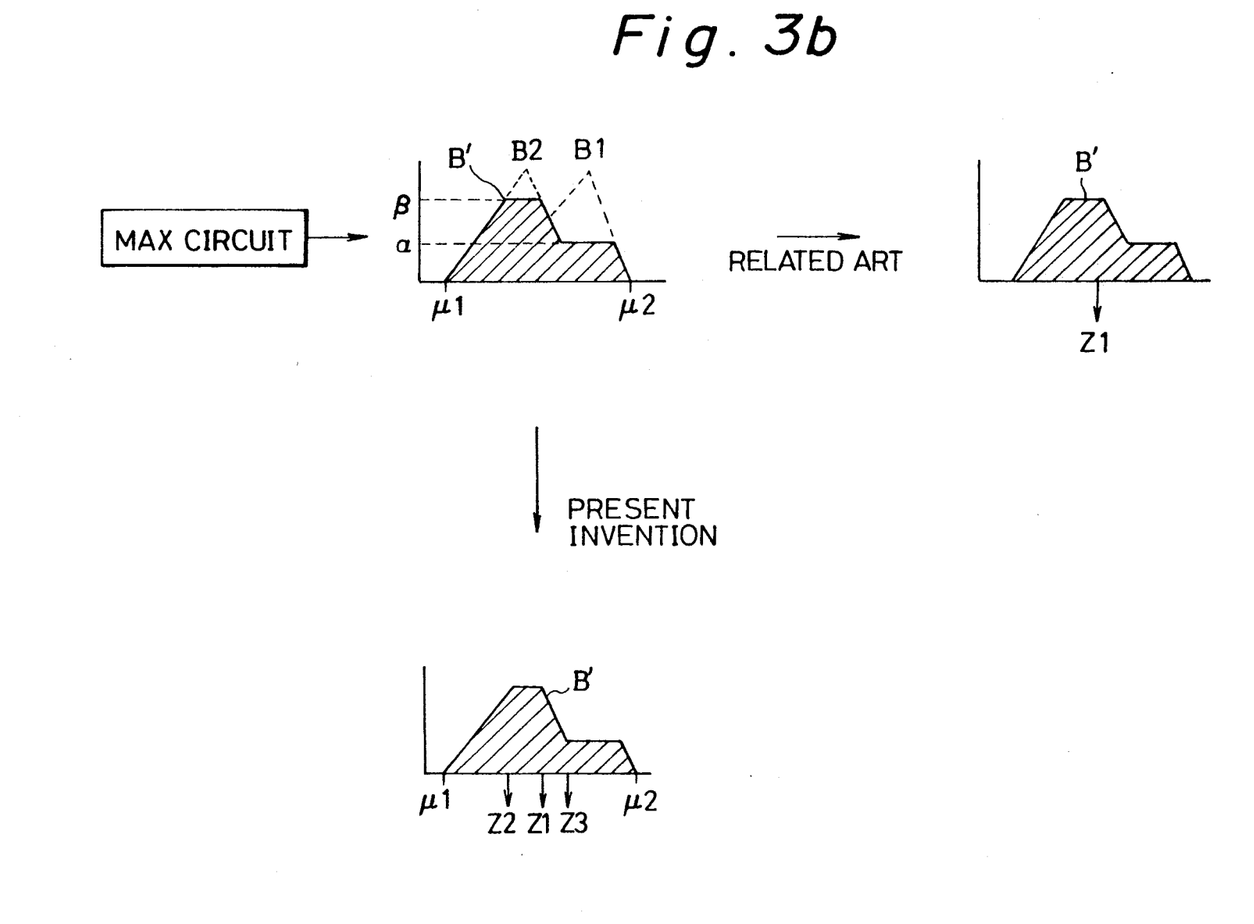
FIG. 3b is an explanatory view for explaining the function of another part of the structure of FIG. 2.

Next, the function of the system 4 is described below with reference to FIGS. $3a$ and $3b$. As illustrated in FIG. $3a$, the input data of a fact is represented by $A'$. To this data $A'$, rules 1 and 2 having conditions $A_1$ and $A_2$, respectively, are applied to obtain matching degree data $B_1$ and $B_2$, respectively. The data $B_1$ and $B_2$ are compounded to obtain a fuzzy inference result $B'$.

FIG. $3b$ illustrates a result $B'$ according to the related art having only one control value $Z_1$ in the upper right side of the drawing and, in the lower side of the drawing, a result $B'$ according to the present invention having three control values $Z_1$, $Z_2$ and $Z_3$ calculated by the system 4 in accordance with the process described below.

The system 4 receives the control value $Z_1$ obtained from the fuzzy inference result $B'$ in accordance with the process for making information not fuzzy such as the barycenter method. The system 4 also receives a minimum value $\mu_1$ and a maximum value $\mu_2$ of the inference result $B'$. In the system 4, the control unit 16 transmits the data of the above-mentioned received values and information data of the number of control values to be transmitted to the system 2 to the stack memory 17 to register the data therein. The memory 17 has a parameter $\xi$ preset therein for calculating another control value from the control value $Z_1$, as illustrated in the upper half of FIG. 4.

Figure 4:
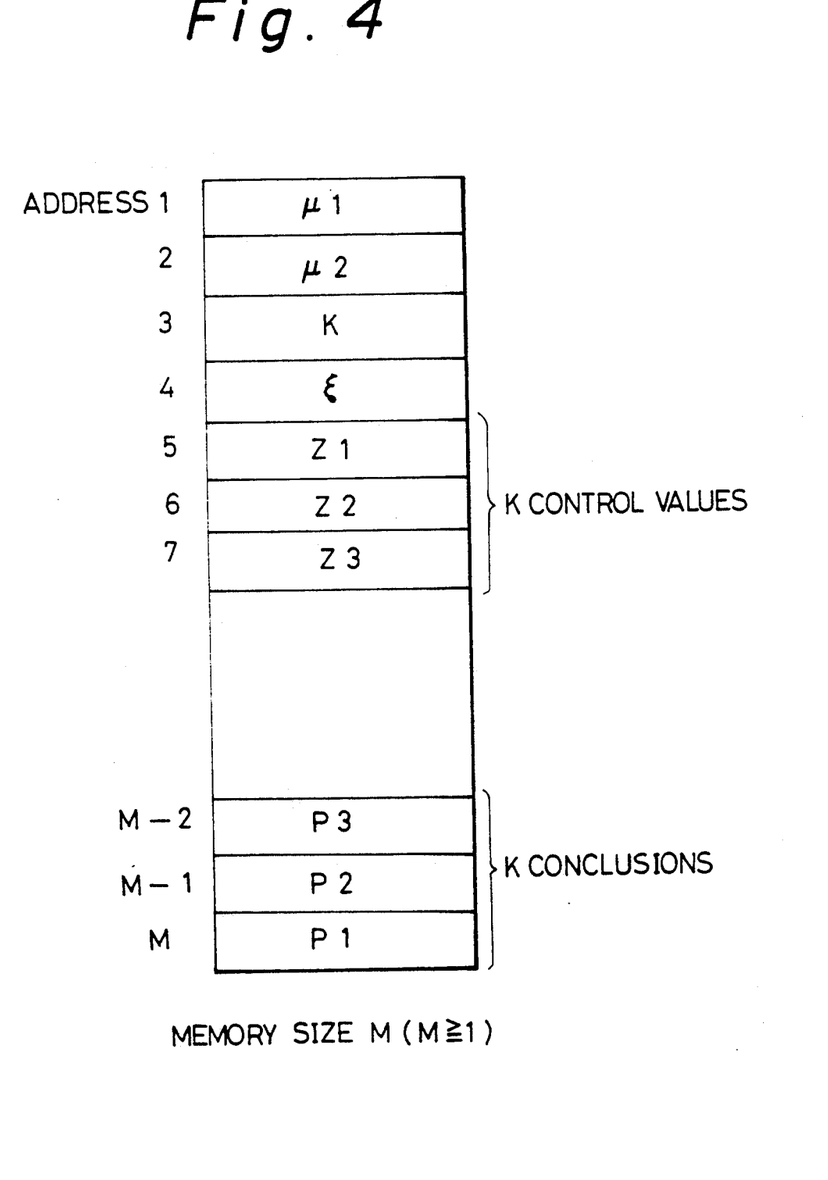
FIG. 4 is an explanatory view representing a state of information registered in the stack memory in accordance with the present invention.

The control unit 16 calculates two control values $Z_2$ and $Z_3$ using the value $Z_1$, the parameter $\xi$, the minimum value $\mu_1$ and the maximum value $\mu_2$ of the inference result $B'$ in accordance with the following equations.

$$Z_2 = Z_1 - \xi(\mu_2 - \mu_1)/100 \tag{1}$$

$$Z_3 = Z_1 + \xi(\mu_2 - \mu_1)/100 \tag{2}$$

The calculated values $Z_2$ and $Z_3$ are registered in the memory 17. It is to be noted that the equations (1) and (2) means that the control value $Z_1$ includes error of about $\xi\%$, for example 5%, to be corrected by the equations.

The inference engine 14 of the system 2 infers on the basis of a plurality of control values, i.e., K values (three values, i.e., $Z_1$, $Z_2$ and $Z_3$, in this particular embodiment) registered in the memory 17 with the use of the rules memorized in the rule-base memory 13. After that, the engine 14 outputs K results of inference (three results, i.e., $P_1$, $P_2$ and $P_3$, in this particular embodiment). The purpose of inference by the system 2 may be decision (diagnosis) of conditions, explanation of conditions, or estimation or assumption of conditions.

The inference function at a time by the system 2 is as follows.

First, the engine 14 fetches one of the input data, that is, the three control values $Z_1$, $Z_2$ and $Z_3$ from the memory 17 and compares the data with the condition of the rule read one by one from the memory 13. If the condition matches with the control value, the corresponding result P is fetched and registered in the working memory 15. When the matching process with respect to all of the rules is ended, the data memorized in the working memory 15 are fetched and registered in a predetermined address of the stack memory 17.

The inference operation mentioned above is executed with regard to all of the three input data. As a result, all of the output data from the system 2 are registered in the memory 17. This situation is represented in FIG. 4. The lower portion of FIG. 4 represents the conclusions obtained from the inference function by the system 2. On the basis of these conclusions, it becomes possible to determine whether the validity of the output from the system 1 (fuzzy inference result B') can be guaranteed or not.

In accordance with the embodiment of the compound expert system of the present invention, it becomes possible to process qualitative fuzzy information that could not be processed according to the single expert system of the related art. In other words, according to the system of FIG. 2 of the present invention, it becomes possible to decide the validity of the definite value output from the system 1 to be used as the control value. This is because of, as mentioned above, the second expert system 2 subsequently connected to the fuzzy expert system 1 to operate in conjunction with the system 1 in such a way that, when the system 2 is activated twice or more, a plurality of inferences are executed with the use of rules registered in the memory 13 one by one for each of the plurality of control values, respectively, and that a plurality of inference conclusions are output from the system 2. Accordingly, it becomes possible to evaluate relatively the validity of one definite value output from the system 1 to be used as the control value, on the basis of the plurality of inference conclusions output from the system 2. Also, due to the arrangement of the present invention mentioned above, it becomes possible to widen the application range of the expert system when compared to a single fuzzy expert system or a single expert system used alone independently.

It is to be noted that in the system of FIG. 2, it is possible to arrange the systems 2 and 4 as one unit combined together.

Many widely different embodiments of the present invention may be constituted without departing from the spirit and scope of the present invention. It should be understood that the present invention is not limited to the specific embodiments described in the specification, except as defined in the appended claims.

What is claimed is:

1. A compound type expert system comprising:
a first expert system for executing fuzzy rule-based inference according to a first rule set which permits describing information with ambiguity of language, and for outputting a definite value;
a second expert system for executing rule-based inference according to a second rule set which describes only information without ambiguity of language; and
a calculation control system arranged between said first expert system and said second expert system for calculating a plurality of control values on the basis of said outputted definite value and for activating said second expert system a number of times related to the number of said control values.

2. A compound type expert system according to claim 1, wherein said first expert system comprises a plurality of fuzzy inference engines, a MAX circuit for compounding a plurality of inference results outputted from said engines thereby to generate a fuzzy inference conclusion, and an antifuzzy circuit for calculating said definite value from said generated fuzzy inference conclusion.

3. A compound type expert system according to claim 2, wherein a plurality of said control values comprise a first control value corresponding to said definite value calculated from said fuzzy inference conclusion by said antifuzzy circuit, and a second control value and a third control value both calculated by using a maximum value and a minimum value of said fuzzy inference conclusion.

4. A compound type expert system according to claim 1, wherein said second expert system comprises a rule-base memory which registers rules describing information in a form without ambiguity of language information, an inference engine for executing rule-based inference on the basis of said rules registered in said rule-base memory, and a working memory.

5. A compound type expert system according to claim 1, wherein said calculation control system comprises a calculation control unit for creating a plurality of control values on the basis of said outputted definite value and activating said second expert system in accordance with the number of said control values, and a stack memory for registering data necessary for creating said control values and obtained during the process of creating said control values.

6. A compound type expert system according to claim 1, wherein said calculation control system and said second expert system are arranged as one unit combined together.

7. A compound type expert system comprising:
a first expert system for executing fuzzy rule-based inference according to a first rule set which permits describing information with ambiguity of language, and for outputting a definite value;
a second expert system for executing rule-based inference according to a second rule set which describes only information without ambiguity of language; and
a calculation control system arranged between said first expert system and said second expert system for calculating a plurality of control values on the basis of said outputted definite value and for activating said second expert system according to the number to said control values,
said first expert system comprising a plurality of fuzzy inference engines, a MAX circuit for compounding a plurality of inference results outputted from said engines thereby to generate a fuzzy inference conclusion, and an antifuzzy circuit for calculating said definite value from said generated fuzzy inference conclusion,
said second expert system comprising a rule-base memory which registers rules describing information in a form without ambiguity of language information, an inference engine for executing rule-based inference on the basis of said rules registered in said rule-base memory, and a working memory,
said calculation control system comprising a calculation control unit for creating a plurality of said control values on the basis of said outputted definite value and activating said second expert system according to the number of said control values, and a stack memory for registering data necessary for creating said control values and obtained during the process of creating said control values.

8. A compound type expert system according to claim 7, wherein said calculation control system and said second expert system are arranged as one unit combined together.

9. A compound type expert system operation comprising the steps of:

executing, in a first expert system, fuzzy rule-based inference according to a first rule set which permits describing information with ambiguity of language, and outputting a definite value;

calculating, in a calculation control system arranged between said first expert system and a second expert system, a plurality of control values on the basis of said outputted definite value, and activating said second expert system a number of times related to the number of said control values; and executing, in said second expert system, rule-based inference said number of times according to a second rule set which describes only information without ambiguity of language.

* * * * *